Aug. 20, 1929.  P. SCHWERIN  1,724,971
ELECTRON DISCHARGE DEVICE
Filed Aug. 28, 1924
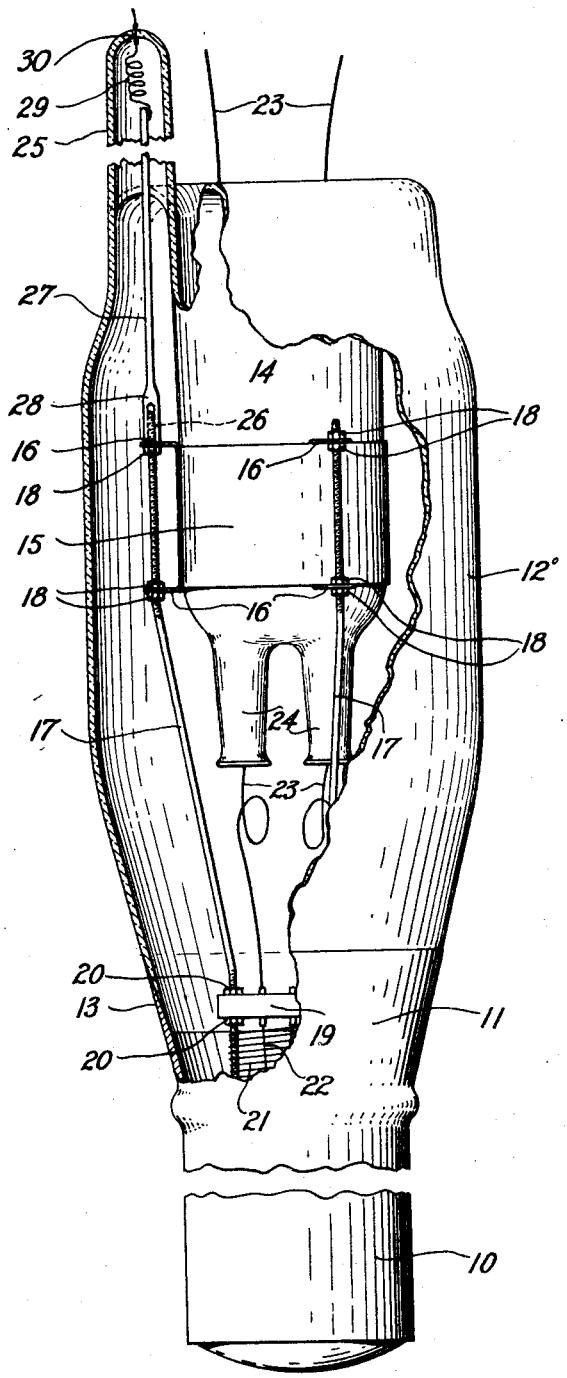
Inventor:
Paul Schwerin,
by E.W. a dam Atty Patented Aug. 20, 1929.

1,724,971

UNITED STATES PATENT OFFICE.

PAUL SCHWERIN, OF NEW YORK, N Y., ASSIGNOR TO WESTERN ELECTRIC COMPANY, INCORPORATED, OF NEW YORK, N. Y., A CORPORATION OF NEW YORK.

ELECTRON-DISCHARGE DEVICE.

Application filed August 28, 1924. Serial No. 734,593.

This invention relates to electron discharge devices and has for an object an improved leading in conductor for devices of this character capable of handling large amounts of power.

In devices of this character, it has been the practice to isolate the grid leading-in wire from the heavy current carrying cathode leading-in wires by means of a centrally disposed long tubular glass member joined to the inner end of the stem of the vessel and projecting a considerable distance beyond the end of the device. This construction is objectionable since the long glass tube, which is generally fused to the stem prior to the assembly of the electrodes, impedes the handling of the device during assembly, and furthermore, a slight strain upon the long glass tube fractures the joint within the stem and renders the glass stem useless.

According to this invention, a relatively short length of glass tubing is fused to the junction of the stem and vessel after the assembly of the electrodes and the sealing-in operation have been completed. A rigid leading-in conductor having a threaded socket at one end is inserted in the short length of tubing and is mechanically connected to the electrode structure within the device.

The drawing illustrates in elevation an electron discharge device with parts broken away to show the assembly of the grid lead.

Referring to the drawing, an electron discharge device is shown which consists of a cup-shaped metal portion 10 having a flared end 11, and a glass portion 12 which is welded to the metal portion at 13, according to the method disclosed in W. G. Houskeeper U. S. Patent 1,294,466, dated February 18, 1919. A stem 14 is fused to the glass portion 12 and is reentrant with respect to the glass portion. A metallic collar 15 surrounds the stem 14 and is frictionally supported thereon. The grid upright members 17 project through the tabs 16 and are rigidly held thereto by means of the units 18, positioned on either side of the tabs. An insulating disc 19 is supported on the upright members by means of the threaded nuts 20. A wire grid 21 and a filament 22 are supported from the insulating disc 19. The filament leads 23 are sealed in the tubular extensions 24 of the stem 14, in accordance with the method disclosed in W. G. Houskeeper U. S. Patent 1,293,441, dated February 4, 1919.

After the assembly has been completed and the stem sealed to the end of the glass portion, a glass tube 25 is fused to the glass vessel at the junction of stem and the outer end of the vessel and directly in line with one of the upright members 17, which has a slightly longer threaded portion 26. The grid lead consists of a metallic rod 27 having an enlarged portion 28, which is internally threaded at one end and a resilient spiral spring 29 welded to the other end. A platinum wire 30 is welded to the free end of the spring 29 to provide a tight seal between the glass and the metal lead.

The grid lead 27 is inserted in the glass tube 25 and screwed to the threaded portion 26 until it is flush with the tab 16 on the collar. The outer end of the glass tube 25 is fused to the platinum wire in the usual manner.

Although the invention is illustrated and described in connection with a grid lead-in wire, it is, of course, understood that the invention may be applied to other electrodes without departing from the spirit of the invention as set forth in the appended claims.

What is claimed is:

1. An electron discharge device comprising a vessel having a metallic portion and a glass portion, said glass portion having a reentrant stem, a pair of filament lead-in wires sealed therein, an electrode assembly including metallic supporting members mounted on and spaced about said stem, said assembly including a grid, a relatively long glass tube fused to said glass portion and in alignment with one of said members, a rod within said glass tube, said rod having means whereby it may be attached to said member by inserting the same through said tube, and a wire connected to the other end of said rod and sealed in the end of said tube.

2. An electron discharge device comprising a vessel having a metallic anode portion and a glass portion, said glass portion having a reentrant stem, a pair of filament lead-in wires sealed in said stem, an electrode assembly including metallic supporting members mounted on and spaced about said stem, said assembly including a grid, said members being threaded adjacent said stem, a relatively long glass tube fused to said glass portion and in alignment with one of said members, a rod within said glass tube, said rod having a threaded socket at one end whereby it may be attached to said aligned member by inserting the same through said tube, and a wire connected to the other end of said rod and sealed in the end of said tube.

In witness whereof, I hereunto subscribe my name this 27th day of August A. D., 1924.

PAUL SCHWERIN.